No. 720,490. PATENTED FEB. 10, 1903.
M. RUTHENBURG.
PROCESS OF REDUCING ORES.
APPLICATION FILED OCT. 16, 1900.
NO MODEL. 2 SHEETS—SHEET 1.

WITNESSES:
E. L. Fullerton.
John C. Bergner

INVENTOR:
MARCUS RUTHENBURG,
by Arthur E. Paige
Atty.

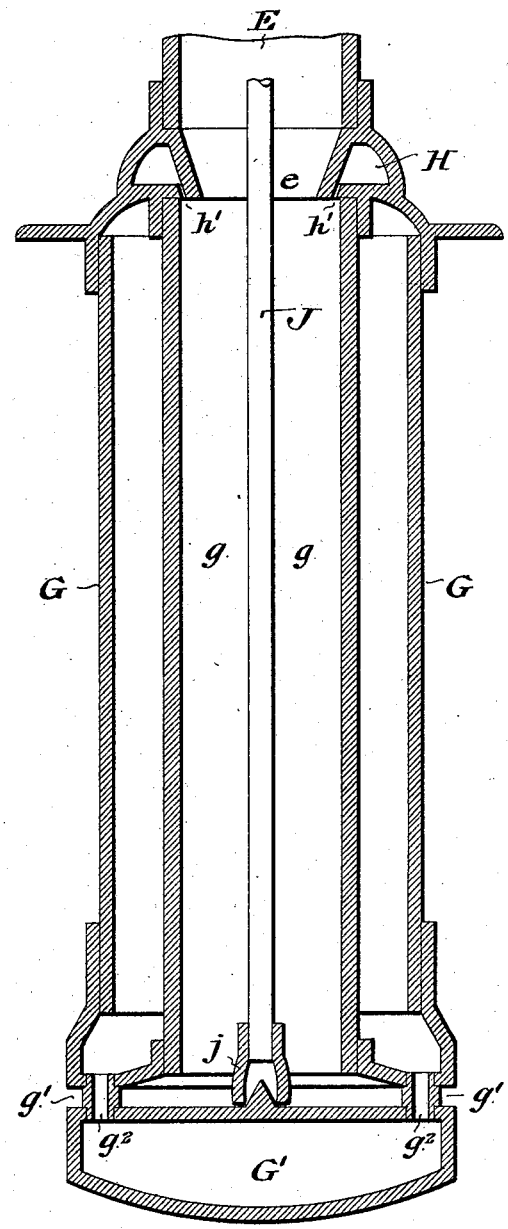

UNITED STATES PATENT OFFICE.

MARCUS RUTHENBURG, OF PHILADELPHIA, PENNSYLVANIA.

PROCESS OF REDUCING ORES.

SPECIFICATION forming part of Letters Patent No. 720,490, dated February 10, 1903.

Application filed October 16, 1900. Serial No. 33,193. (No specimens.)

*To all whom it may concern:*

Be it known that I, MARCUS RUTHENBURG, of Philadelphia, in the State of Pennsylvania, have invented certain new and useful Improvements in Processes of Reducing Ores, whereof the following is a specification, reference being had to the accompanying drawings.

My present invention is particularly adapted to reduce and separate into two products ore containing volatile and involatile metals, said products being, first, a molten mixture comprising the reduced involatile metals, and, second, a mixture of gases containing the bulk of the volatile metals, so that both products may be susceptible of subsequent independent treatment for the recovery of their valuable constituents by methods forming no part of my present invention.

Generally stated, my process consists in maintaining a fluid pool of molten magma beneath a highly-heated atmosphere, mixing the ore in a comminuted state with fuel, preferably a liquid hydrocarbon, spraying the mixture of ore and fuel into said atmosphere, preferably with compressed air, burning the hydrocarbon, and thereby reducing the ore over said pool of magma, receiving in said pool the involatile products comprising reduced metal, and progressively withdrawing from said pool during the conduct of the process the molten magma which has been thus charged with reduced metal.

It is to be understood that the molten magma aforesaid serves, first, to gather and flux the involatile reduced metals in the pool, and, second, as a liquid vehicle in which said reduced metals are conveniently withdrawn from the pool to be subsequently manipulated. As hereinafter described, the fluid pool of molten magma is continuously maintained during the process by progressively adding freshly-molten magma thereto in compensation for such portions of the magma as are withdrawn charged with the reduced metals.

In the accompanying drawings I have shown a form of apparatus which I have found convenient for the conduct of my process; but it is to be understood that I do not desire to limit myself to the use thereof.

Figure 3:
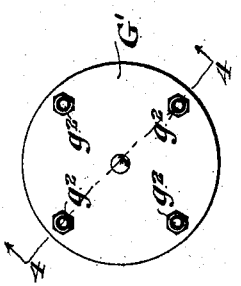
Figure 1:
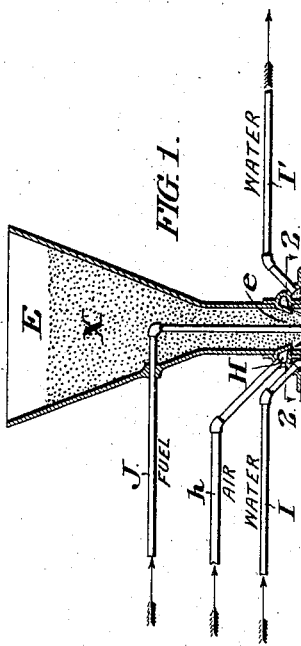
Figure 2:
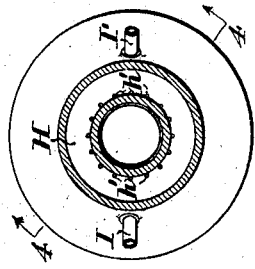

In said drawings, Figure 1 is a central vertical sectional view of a furnace. Fig. 2 is a plan sectional view taken on line 2 2 in Fig. 1. Fig. 3 is a plan sectional view taken on the line 3 3 in Fig. 1. Fig. 4 is a fragmentary sectional view of the hopper, &c., taken on the line 4 4 in Figs. 2 and 3.

In said figures, A is a furnace-chamber, at the bottom of which is a pool of molten magma B. Said chamber is conveniently circular in form and so arranged that the molten magma extends from side to side thereof. Said pool is continuously maintained in a fluid state during the conduct of the process, freshly-molten magma being added thereto through the inlet C in compensation for the charged portions of magma, which are withdrawn through the outlet D. The apertures $a$ are conveniently provided in the chamber-wall to enable the operator to ascertain the condition of the atmosphere within said chamber.

The raw material X is introduced to the chamber A through the hopper E, which is fixed at the top thereof. Said hopper E by means of the restricted outlet $e$ at its bottom communicates with the mixing-chamber $g$, and said hopper and outlet are so proportioned and arranged that the raw material X, which is in powdered form, may gravitate within said chamber $g$ at a predetermined rate. Surrounding the hopper-outlet $e$ at the top of the mixing-chamber $g$ is an air-blast chamber H, to which air is supplied under pressure through the pipe $h$. The bottom of said chamber H is provided with a circumferentially-arranged series of blast-orifices $h'$, which direct the air-blast beneath the hopper-outlet $e$ in jets converging within the chamber $g$, and the relation of the parts is such that the powdered ore from the hopper E is agitated by and thoroughly mixed with the air-blast before reaching the bottom of said chamber $g$. Said chamber $g$ is formed by the cylindrical water-jacket G and terminates in a circumferential blast-crevice $g'$ at the junction of said jacket G with the water-head G'. Said jacket G and head G' are maintained in predetermined relation by the nipples $g^2$, (best shown in Figs. 3 and 4,) which also serve to facilitate the circulation of water or other cooling medium from the pipe I through the members G G' to the discharge-pipe I', as indicated by the arrows in Fig. 1.

A fluid fuel, such as oil or gas, is distributed within the mixing-chamber $g$ in the region of the blast-crevice $g'$ by the supply-pipe J, which terminates in a discharge-nozzle $j$ at the bottom of said chamber. The initial ignition of said fuel is effected by contact with the molten magma in the pool B, and the continued combustion of said fuel serves to maintain a highly-heated atmosphere within the chamber A over said pool, such heat of combustion being of course supplemented by the heat arising from said pool.

The arrangement of the parts above described is such that the ore, air, and fuel are uniformly mixed in predetermined proportions within the chamber $g$ and sprayed therefrom through the crevice $g'$, as indicated in Fig. 1, so that said spray reaches the highly-heated atmosphere within the chamber A in condition for practically instantaneous combustion and is there burned over the pool B, with the result that the volatile portions thereof are volatilized within said chamber and the involatile portions of the raw material gravitate into said pool of molten magma. It is to be understood that the pressure of the incoming blast suffices to discharge the gaseous product through the outlet K, and the involatile product gathered to the magma is progressively withdrawn with the latter through the outlet D.

I have found it convenient to employ a magma consisting of thirty parts $Si,O_2$ and thirty-five parts of Fe in treating a typical ore, consisting of Fe, twenty; Zn, thirty; Pb, five; $Si,O_2$, five; S, forty; Ag, ten ounces, and Au, .05 of an ounce. Said ore having been sprayed into a highly-heated atmosphere, as hereinbefore described, the greater portion of Zn, Pb, and S are fumed, producing an intimate mixture of sulfates and oxids and some Ag and Au with the products of combustion of the fuel. Fe and $Si,O_2$ being involatile are precipitated into the pool of magma and are withdrawn therewith as a molten mixture of approximately sixty per cent. Fe; five per cent. $Si,O_2$; five per cent. Zn; ten per cent. Pb; five per cent. S; thirty ounces Ag; and .15 of an ounce Au.

It is to be noted that the whole quantity of the material treated by my process, as above described, is separated into two products—to wit, the involatile constituents gathered in the molten mixture discharged with the magma through the outlet D and the fume or gas containing the volatile portion of said material discharged through the outlet K.

Although the subsequent treatment of the two products of my process forms no part of my present invention, it may be noted that the reduced metals in the molten mixture aforesaid may be subsequently separated from the slag of the magma by gravitation in settling-pots, and the valuable constituents of the gaseous product may be independently recovered by any convenient method.

It is to be understood that I do not desire to limit myself to a magma of the composition specified, as it is obvious that various modifications may be made as to the means employed without departing from the essential features of my process.

I claim—

1. The herein-described process of reducing ore containing volatile and involatile metals, which consists in maintaining a fluid pool of molten magma beneath a highly-heated atmosphere; mixing the comminuted ore with hydrocarbon; spraying said mixture into said atmosphere; burning the hydrocarbon and thereby reducing the ore over said pool; receiving in said pool the involatile products, comprising reduced metal; and, progressively withdrawing from said pool, during the conduct of the process, the molten magma charged with reduced metal, substantially as set forth.

2. The herein-described process of reducing ore containing volatile and involatile metals, which consists in maintaining a fluid pool of molten magma beneath a highly-heated atmosphere; mixing the comminuted ore with a fluid hydrocarbon; spraying said mixture with compressed air, into said atmosphere; burning the hydrocarbon and thereby reducing the ore over said pool; receiving in said pool the involatile products, comprising reduced metal; and, progressively withdrawing from said pool, during the conduct of the process, the molten magma charged with reduced metal, substantially as set forth.

3. The herein-described process of reducing ore containing volatile and involatile metals, which consists in maintaining a fluid pool of molten magma beneath a highly-heated atmosphere; mixing the comminuted ore with hydrocarbon; spraying said mixture into said atmosphere; burning the hydrocarbon and thereby reducing the ore over said pool; receiving in said pool the involatile products, comprising reduced metal; progressively withdrawing from said pool, during the conduct of the process, the molten magma charged with reduced metal; and, progressively withdrawing the volatile products from said atmosphere, separately from said magma, substantially as set forth.

MARCUS RUTHENBURG.

Witnesses:
  ARTHUR E. PAIGE,
  E. L. FULLERTON.